United States Patent [19]

Griffiths

[11] 4,029,028

[45] June 14, 1977

[54] DEVICE FOR METERING GRANULAR MATERIAL

[76] Inventor: Peter Murray Griffiths, 19 Cuba St., Marton, New Zealand

[22] Filed: Apr. 19, 1976

[21] Appl. No.: 678,038

[30] Foreign Application Priority Data

Apr. 18, 1975 New Zealand .................... 177280

[52] U.S. Cl. .................................. 111/86; 111/85; 222/410
[51] Int. Cl.[2] ...................... A01C 5/04; A01C 7/12
[58] Field of Search .................. 222/177, 410, 414; 291/32; 111/86, 77, 78

[56] References Cited

UNITED STATES PATENTS

| | | |
|---|---|---|
| 2,292,909 | 8/1942 | Thoma et al. ...................... 111/86 |
| 2,499,095 | 2/1950 | Hall .................................. 111/86 |
| 2,923,444 | 2/1960 | Orendorff ........................... 222/410 |
| 2,940,640 | 6/1960 | Erickson ............................ 222/177 |

*Primary Examiner*—Stanley H. Tollberg
*Assistant Examiner*—Hadd Lane

[57] ABSTRACT

A metering device is described which provides for very accurate metering of granular material such as seeds or fertilizer. The device incorporates two main components: a solid casing having a slot with an open side and decreasing cross-section, and a corresponding rotor which frictionally urges material along the slot. The rotor has a resilient surface and can be in the shape of a disc or of a roller to correspond with the shape of the casing. The device allows significant savings in the spreading of granular material over conventional devices.

16 Claims, 7 Drawing Figures

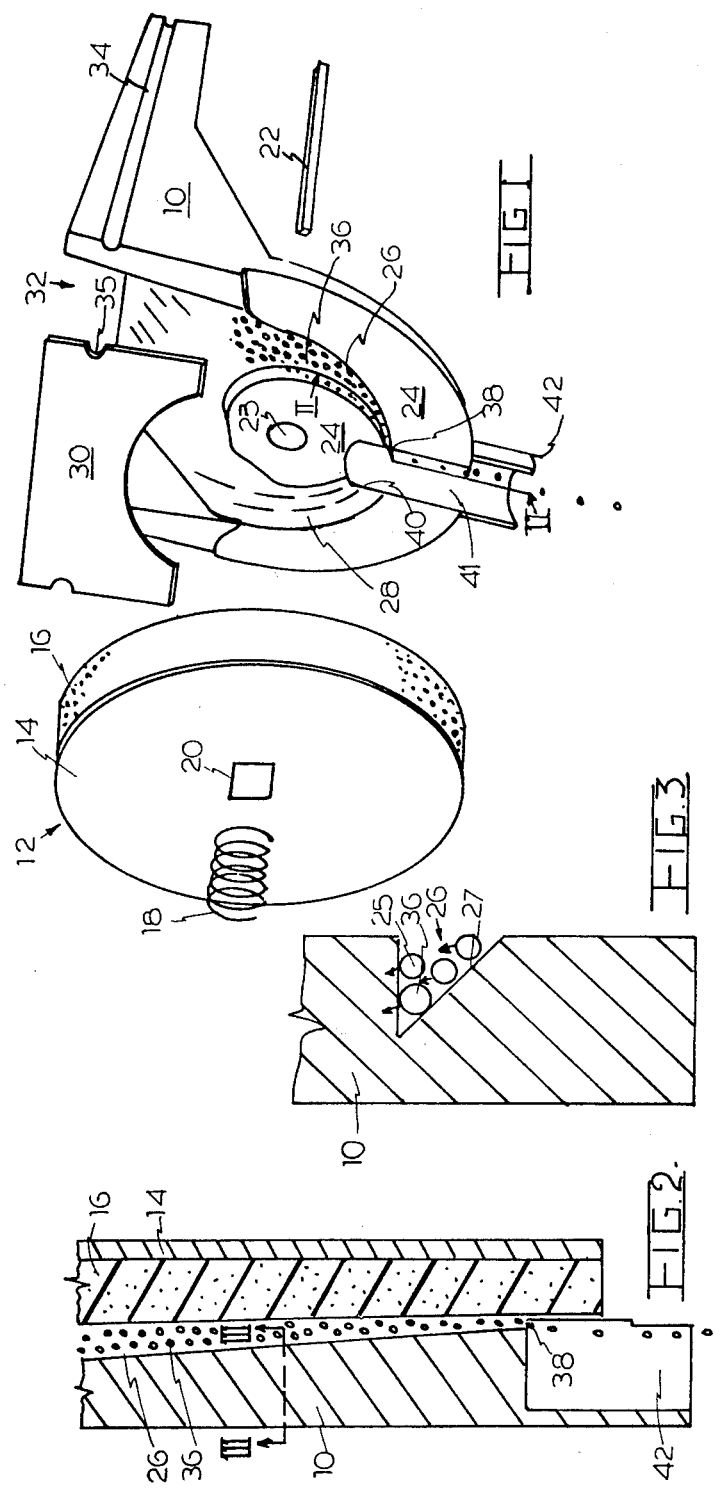

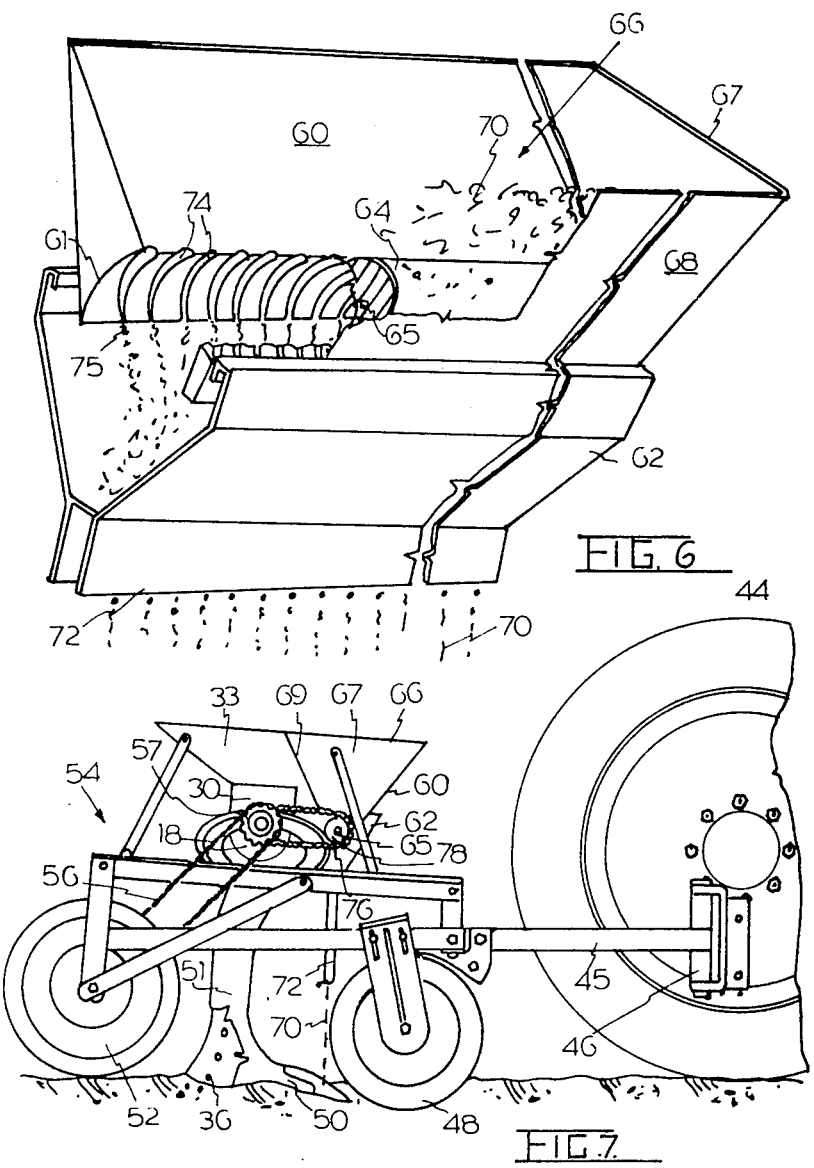

DEVICE FOR METERING GRANULAR MATERIAL

BACKGROUND OF THE INVENTION

1. Field of Invention

This invention relates to a metering device for dispensing granular material in a predetermined regular manner. In particular it relates to a metering device particularly useful in conjunction with a chisel-coulter for seeding and/or dispensing granular fertilizer.

2. Description of the Prior Art

It is known, for example, in New Zealand specification No. 126,307, to employ a rotatable disc having resilient facing material thereon to frictionally engage granular material at an orifice in a substantially flat surface and to urge the granular material across the flat surface to a discharge area. In so doing the individual granules compress the resilient material enhancing its carrying capacity. While such a device is satisfactory for somewhat uneven delivery for granular material it suffers from the disadvantage that the discharge orifice can be rather easily blocked thus cutting off delivery or, on the other hand, the granular material might be discharged in a rush and spread out unevenly over the face against the resilient material is rotating. In either case, metering is unequally controlled. With rapidly escalating costs of seeds and fertilizer, inefficient metering of these materials can be highly detrimental to economic farming.

It is also known from U.S. Pat. No. 3,172,574 that a roller having a resilient surface can be positioned to close the open bottom of a V-shaped trough and delivery of seeds, for example grass seeds, or fertilizer in a curtain at the bottom of the trough can be effected by rotation of the roller. The surface against which the roller rotates and over which material is transported is a substantially non-resilient flat surface. While delivery of the granular material can be effected, consistently metered delivery cannot be achieved for similar reasons as suggested as hereinabove with respect to the other embodiment described.

It is an object of this invention to provide a device for metering granular material in a regular manner.

It is a further object to overcome the disadvantages discussed hereinabove by at least to provide the public with a useful choice.

SUMMARY OF THE INVENTION

Accordingly the invention may broadly be said to consist in a device for metering granular material comprising a non-resilient solid member having a slot passing therethrough defining a passage and a complementary conveying rotor in association therewith, said slot being open at both ends and along at least a portion of one side over the length thereof, one said open end of said slot having a smaller cross-sectional area than the other said open end, said open end of the smaller cross-sectional area being a discharge orifice, said open end of the larger cross sectional area being a feed orifice, said rotor having a resilient surface and being mounted to rotate relative to said solid member, said resilient surface being engageable with said open side portion of said slot throughout each revolution of said rotor, the arrangement being such that in use said rotor frictionally engages granular material in said slot to convey said granular material towards said discharge orifice in said slot whereby said granules are arranged for metered discharge.

In a preferred embodiment the non-resilient solid member is a casing having a flat surface, the slot is a recess in said flat surface, the longitudinal axis of said slot being curved, and the rotor is a flat disc having a resilient flat surface which is urged against the flat surface of said casing.

In a further alternative embodiment the solid member is a portion of a hollow cylinder, the slot is a recess in the inner curved surface of said portion of a hollow cylinder and said rotor is a cylindrical roller whose outer circumference corresponds to the inner circumference of said portion of a hollow cylinder.

BRIEF DESCRIPTION OF THE DRAWINGS

The invention may be more fully understood by having reference to the accompanying drawings wherein:

FIG. 1 is an exploded perspective view of one embodiment of the invention.

FIG. 2 is the section II—II indicated in FIG. 1.

FIG. 3 is the section III—III in FIG. 2.

FIG. 6 is a perspective view partially broken away and foreshortened of a further embodiment of the invention.

FIG. 7 is a side elevation of the trailer seeder illustrated in FIG. 4 adapted to include the embodiment of the invention illustrated in FIG. 6 with a plurality of the embodiments illustrated in FIGS. 1 to 3.

DESCRIPTION OF THE PREFERRED EMBODIMENT

Figure 4:
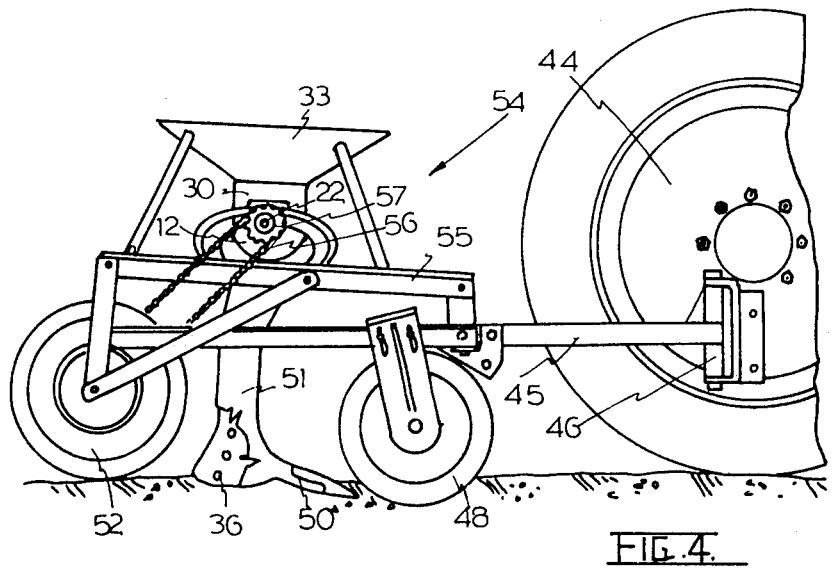
FIG. 4 is a side elevation of a feeder trailer incorporating a plurality of the embodiments shown in FIGS. 1-3 in use behind a farm tractor, a portion of the tractor being illustrated.

Turning to FIG. 1 it can be seen that the metering device comprises a casing 10 which is preferably of cast aluminium but can be constructed of any other suitable tough non-resilient material. The casing 10 is provided with a substantially flat smooth face portion 24 out of which is hollowed a throat 41 which extends into a mouth 42. A hollow bore 23 which may include a bearing is provided for the passage of rotatable shaft 22. Shaft 22 is preferably square in cross section. In face 24 there are provided a pair of slots or recesses 26 and 28 which follow a curved path to end in restricted orifices 38 and 40. Slot 26 is of much narrower cross sectional area to allow passage of granular material of small particulate size. Slot 28 may be used for the passage of granular material of much larger particulate size. In the upper part of casing 10 there is defined a feeding hopper 32, the open end of which is closed by a gate 30. A rod, not shown, is provided in recesses 34 and 35 to hold gate 30 in position. Complementary to face 24 there is provided a foam disc 16 on a disc plate 14 which together comprise rotor element 12. Through the centre of rotor element 12 there is provided a square hole 20 in which squared shaft 22 maybe snugly fit to rotate rotor elements 12. Hole 20 is preferably eccentric to the disc for reasons set out below. Spring 18 is provided to urge resilient member 16 against face 24 of the casing 10. From FIG. 2 it will be seen that the depth of recess 26 relative to surface 24 gradually decreases as it approaches orifice 38. Similarly from FIG. 3 it can be seen that slot 26 is preferably a triangular cross section. Slot 26 preferably has a different centre of curvature from that of rotor element 12.

In operation, granular material, such as seeds, is provided in feeding hopper 32. The granular material is fed into the top of slot 26 through gravity optionally assisted by agitation of some kind. In the embodiment shown, rotor 12 is rotated in a clockwise direction whereby the resilient surface 16 engages with granules which protrude above the edge of surface 24. By frictional engagement the granules are urged along slot 26 to the orifice 38 thereof. It will be seen from FIG. 2 that the resultant force applied by the resilient material 16 increases as the depth of the recess decreases towards the orifice. Similarly as can be seen from FIG. 3, the resultant forces indicated by the arrows are against inner surface 25 of the slot 24. The net result of the two actions is that the granular material is lined up in an ordered manner and delivered can be carefully metered within predetermined limits. These limits are determined by the particle size, the orifice size and the rate of rotation of shaft 22. The resultant forces shown in FIG. 3 are enhanced by the eccentric positioning of hole 20.

When the granular material is of fine particulate size it is advantageous to have a non-porous surface on resilient material 16 to prevent penetration into the foamed material and uneven discharge thereof.

Figure 5:
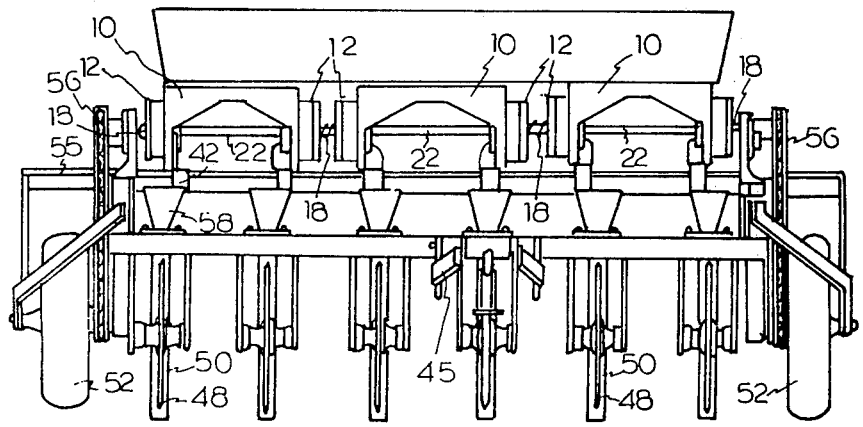
FIG. 5 is a front elevation of the feeder trailer illustrated in FIG. 4.

Turning to FIGS. 4 and 5 a trailer feeder 54 is provided having a frame 55 which in turn is provided with a pair of wheels 52. Mounted on the frame is a leading disc coulter 48 which is followed by a chisel-coulter 50 mounted at the bottom of a hollow shaft 50. As can be seen by the cut away portion of shaft 51 seeds 36 metered out by the metering device fall into the slit or narrow trench dug open by chisel coulter 50. Mounted across the frame above shafts 51 and communicating directly therewith are provided a funnel 58. Discharge mouths 42 from the seeding devices are mounted over the funnel so that the course of travel from the feeders is out of discharge orifice 38, down funnel member 58 and through hollow shaft 51 to the ground. Across frame 55 there are provided three pairs of casings 10 each having the requisite number of associated rotor elements 12. A single shaft 22 is journalled at either end in bearings common with sprocket wheels 57. Over sprocket wheels 57 there are provided chains 56 which are driven by drive transmitted from wheels 52. Appropriate gearing is provided adjacent wheels 52, although it is not shown here, so that the direction of rotation of the shaft 22 can be altered. There is also provided a carrying hopper 33 for storage of seeds above feeding hoppers 32.

In operation, frame 55 is lowered into the position illustrated in FIGS. 4 and 5 and towed over the ground to be planted behind a tractor, the wheel 44 of which is illustrated. Feeder 54 is provided with a tow bar 45 which is pivotally mounted on pin 46 of the tractor, a rear wheel 44 of which is illustrated. As the feeder trailer is dragged over the ground, wheels 52 rotate driving chain 56 which in turn rotates shaft 22 causing metering of the seeds 36 out of orifices 38 of each of the seeding devices and down shaft 51 to drop onto the group immediately following chisel coulters 50. Seed from carrying hopper 33 can be provided into feeding hoppers 38 by gravity or by other suitable means such as a rotating agitator. This method of planting is particularly useful where individual plants must be spaced in a predetermined position or part. The rotation of shaft 22 is synchronised with the speed of movement of seeder trailer 54 over the ground, thus ensuring even spacing of the seeds regardless of the speed at which the seeder is advancing.

In alternative embodiment of the invention which is particularly useful for spreading a curtain of granular material, for example, fertilizer or grass seed, is illustrated in FIG. 6. The casing 60 is a portion of a hollow cylinder having a regular inner cylindrical surface 61. In conjunction with walls 67 and 68 there is defined a hopper 66, the fourth side of which is omitted for clarity, for the storage of the granular material. At the bottom of the hopper there is provided a roller 64 mounted on a central shaft 65. This roller can either be constructed substantially all of resilient material such as polyurethane foam or have a solid core with a foam surface. There are provided a series of slots 74 comprising recesses in curved surface 61 of casing 60. These slots terminate in a series of orifices 75 for discharge of granular material. Frictional contact of granular material will be best when the outer circumference of the roller 64 corresponds to the inner circumference of curved surface 61. Positioned directly below the hopper is a discharge manifold 62 which is substantially V-shaped in cross-section and has an elongate discharge spout 72 extending along the length thereof.

In operation as seen in FIG. 6 roller 64 is rotated in a counter clockwise direction. Particulate material is frictionally conveyed into slot 64 and the material lined up in the same manner as in the embodiment illustrated in FIG. 1. In the embodiment illustrated, the longitudinal axes of slots 74 substantially follow the corresponding circumferences of the curved surface 61. In an alternative embodiment, not illustrated, these longitudinal axes can follow a somewhat spiral path to increase abutment of particulate material against the sides of the slots to achieve the effect illustrated in FIG. 3.

In FIG. 7 there is illustrated the mounting of the embodiment shown in FIG. 6 on to trailer seeder 54 in advance of the embodiment mounted as shown in FIG. 4. Hopper 33 is truncated by dividing panel 69 so that hopper 66 has the greater volume. Discharge manifold 62 is mounted onto the frame in advance, above the chisel coulter. Discharge outlet 72 is extended below protruding frame members to discharge particulate material slightly in advance of chisel coulter 50. Shaft 65 at the centre of roller 64 is journalled in a bearing in common with sprocket wheel 78 over which is passed chain 76. Drive is transmitted to chain 76 from shaft 22 by means of a further sprocket wheel which is not visible.

In this embodiment, a seeding method is provided wherein fertilizer is laid in advance of a chisel coulter in a curtain across the path of traverse of the seeder trailer and seeds are metered out in predetermined spaced rows below the surface of the soil which has been already fertilized. In a further alternative method possible with this embodiment, where land is covered with weed or other non-cultivated plants a herbicide alone or together with fertilizer may be provided in hopper 66. Thus weed killing, fertilizing and planting may be carried out in a single pass of the apparatus.

What I claim is:

1. A device for metering granular material comprising a non resilient solid member having a slot passing therethrough defining a passage and a complementary conveying rotor in association therewith, said slot being open at both ends and along at least a portion of one side over the length thereof, one said open end of said slot having a smaller cross sectional area than the other said open end, said open end of smaller cross sectional area being a discharge orifice, said open end of larger cross sectional area being a feed orifice, said rotor having a resilient surface and being mounted to rotate relative to said non resilient solid member, said resilient surface being engageable with said open side portion of said slot throughout each rotation of said rotor, the arrangement being such that in use said rotor frictionally engages granular material in said slot to convey said granular material towards said discharge orifice in said slot whereby said granules are arranged for metered discharge.

2. The device as claimed in claim 1 wherein said slot side is open along the entire length thereof from orifice to orifice.

3. The device according to claim 2 wherein said slot has a continuously decreasing cross-sectional area from said feed orifice to said discharge orifice.

4. The device according to claim 3 wherein said slot is triangular in cross-section.

5. The device according to claim 4 wherein said resilient surface on said rotor comprises cellular plastics material.

6. The device according to claim 1 wherein said rotor comprises a solid flat disc having resilient facing material thereon.

7. The device according to claim 6 wherein said non-resilient solid member comprises a casing having a flat surface and said slot comprises a recess in said flat surface, the longitudinal axis of the said slot being curved.

8. The device according to claim 7 wherein the curve of said slot is eccentric to said disc.

9. The device according to claim 6 wherein there are provided first and second said slots following opposite curved paths from feed orifices to discharge orifices, the outlet orifice of one said slot being of greater cross-sectional area than the orifice of the other said slot, and said rotor being rotatable in one direction to convey granular material along one said slot and rotatable in an opposite direction to convey granular material along said second slot.

10. The device according to claim 6 in association with at least one other said devices mounted on a trailer seeder implement in association with a chisel coulter, the arrangement being such that granular material is metered into a slot cut by a chisel coulter on said seeder trailer implement.

11. The device according to claim 1 wherein said solid member is a portion of a hollow cylinder and said rotor is a cylindrical roller cooperable therewith.

12. The device according to claim 11 wherein the interior of said portion of said hollow cylinder is substantially regular and there are provided a plurality of slots comprising recesses in said regular surface.

13. The device according to claim 12 wherein each said slot follows substantially an inner circumference of said portion of a hollow cylinder.

14. The device according to claim 12 wherein said slot follows a substantially spiral path on the inner surface of said hollow cylinder.

15. The device according to claim 11 wherein said roller has a solid central core.

16. The device according to claim 11 mounted on a seeder trailer implement.

* * * * *